March 10, 1959 R. D. BOGNER 2,877,430

TRANSMISSION LINE TRANSFORMER

Filed March 24, 1954

2 Sheets-Sheet 1

INVENTOR.
RICHARD D. BOGNER

BY Ostrolenk & Faber

ATTORNEYS

March 10, 1959 R. D. BOGNER 2,877,430

TRANSMISSION LINE TRANSFORMER

Filed March 24, 1954

2 Sheets-Sheet 2

INVENTOR.
RICHARD D. BOGNER

BY Ostrolenk & Faber

ATTORNEYS

United States Patent Office 2,877,430
Patented Mar. 10, 1959

2,877,430

TRANSMISSION LINE TRANSFORMER

Richard D. Bogner, Bethpage, N. Y., assignor to Standard Coil Products Co., Inc., Los Angeles, Calif., a corporation of Illinois Application March 24, 1954, Serial No. 418,429

2 Claims. (Cl. 333—26)

My present invention relates to a transmission line mode transformer, and more particularly to a line transformer for converting an unbalanced mode in one line to a balanced mode in another line.

It is well known that it is often necessary to couple a balanced line to an unbalanced one. For example, television receivers, especially those operable in the U. H. F. range (470–890 mc.), require a coaxial transmission line (unbalanced) between the antenna and the input of the television receivers to reduce radiation loss while the circuitry at the input of the receiver, namely the television tuner, may be of the balanced type.

Since the two systems to be connected together, which for simplicity's sake from now on will be referred to as "lines," usually have different characteristic impedances, it has become common to also incorporate an impedance transformer into the design of these balance-to-unbalance line transformers, which are also known more simply as "baluns."

In the case of television receivers, for example, it is necessary to joint a 50 ohm coaxial line propagating an unbalanced mode to a 300 ohm two-wire line propagating a balanced mode, where a balanced mode can now be more precisely defined as existing (on the line consisting of two identical parallel conductors symmetrically placed with respect to ground) when the current from one conductor is equal in amplitude and opposite in phase with the current on the other conductor in any cross-section.

The connection between the two lines must be obtained with the minimum of loss at all the desired frequencies of operation which in U. H. F. television means the band of frequencies from 470 to 890 mc. This loss may be considered as being composed of three quantities:

(*a*) Energy reflected toward the generator from the balun input measured by the input voltage standing wave ratio (VSWR);

(*b*) Energy dissipated in the metallic and dielectric structures within the balun, usually called insulation loss;

(*c*) Energy transformed by the balun to modes other than the power balanced mode on the two-wire line measured in terms of "balance to unbalance ratio" or the ratio of power in unbalanced modes to the power in the desired balanced mode.

Thus, to reduce losses it is necessary to reduce the energy transformed by the balun to modes other than a power balanced mode over the whole range of operation. This is obtained by making the balun inherently balanced at all frequencies and this is arrived at by a balun construction in which the outer conductor of the coaxial system is connected to one conductor of the parallel wire system and the inner conductor of the coaxial system is connected to the second conductor of the parallel wire system by means of a transverse strap.

In a well known manner when such a construction is used, the balun will meet the frequency insensitive balance characteristics which are as follows:

(1) The dominant coaxial line mode excites equal and oppositely directed currents in the parallel wire line;

(2) The impedance between both conductors of either line and ground is the same at the junction independent of frequency.

The latter is true, however, only if the self-inductance of the strap or cross lead is negligible, since otherwise the inductance introduced by the strap causes a high VSWR indicating a large loss of the type mentioned in (*a*) above. To reduce the loss mentioned in (*b*), the balun must be constructed so that it utilizes the minimum amount of loss in materials whether metallic or dielectric, and must be also, of course, as small as consistent with the other requirements.

It was also previously mentioned that the balun has usually incorporated in it an impedance transformer to permit matching of different impedances; for example, 50 ohms of a coaxial line with 300 ohms of a two-wire line. Up to recent times such a transformer necessitated the use of four constant impedance transmission line quarter wave length sections if it was desired to maintain the VSWR to values less than 1.1. However, it was recently found by Fubini and Sutro (P. I. R. E., October 1947, pages 1153–1155), that it is possible to utilize the varying impedance of the balun arm which is in parallel with the transformer at the junction to reduce to two the number of constant impedance transmission line quarter wave length sections required for the above VSWR over the U. H. F. television band.

This design, however, makes possible the construction of a balun which at the higher U. H. F. frequencies has a VSWR of the order of 1.5 which is considered unacceptable, the general accepted value of VSWR being around 1.1.

The reason for this larger value of VSWR and therefore for this increase in reflected energy as compared to the operation of the balun at lower frequencies seems to be due to the fact that the inductance of the strap connecting the inner conductor of the coaxial line to one conductor of the parallel wire line becomes large in this range of frequencies. This makes the construction of balun following the design of the above mentioned reference unacceptable to the industry.

In the present invention the above problem is overcome by essentially reducing the effect of the strap inductance at the higher frequencies of operation.

Accordingly a main object of the present invention is the provision of means for constructing a balun having acceptable VSWR over a desired U. H. F. band.

A more specific object of the present invention is the provision of means for reducing the inductance at the junction of the balun.

Another object of the present invention is the provision of means for reducing the strap inductance of the balun.

These and other objects of the present invention will become more apparent from the following description when taken in connection with the drawings in which.

Figure 1:
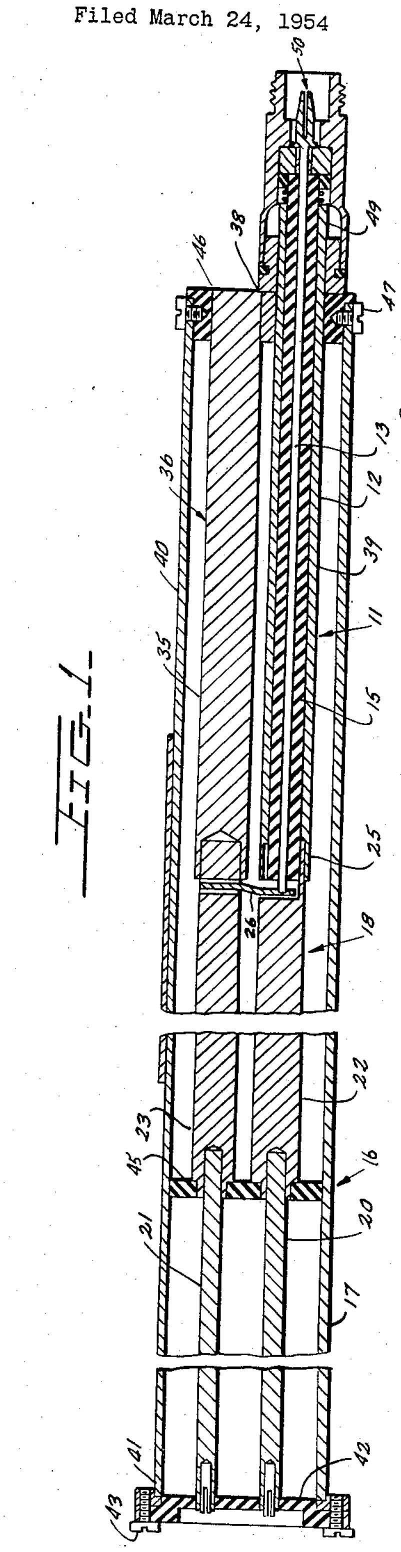
Figure 1 is a cross-section of the balun of the present invention.

Referring first to Figure 1 showing the longitudinal cross-section of one embodiment of the balun of the present invention, the coaxial system 11 consists of an outer conductor 12, an inner conductor 13, an insulating sleeve 15 positioned between the inner and outer conductor to electrically insulate the two conductors. The parallel wire line system 16 consists of two sections 17 and 18 which form the two sections of the impedance transformer for transforming in this particular case 50 ohms on the coaxial side into 300 ohms on the parallel wire side.

Section 17 consists of two parallel wire conductors 20 and 21 which extend partly into conductors 22 and 23, respectively, of the second parallel wire section 18. The desired 300 ohm load is connected at the free end of conductors 20 and 21 while the balun junction is at the free end of conductors 22 and 23.

The junction consists essentially of a direct connection between conductor 22 of section 18 and outer conductor 12 of coaxial system 11. This direct connection is shown at 25 of Figure 1 and Figure 3 and is obtained by connecting an extension of conductor 18 to the inner side of outer conductor 12 of coaxial system 11.

The balun junction between conductor 23 of section 18 and inner conductor 13 of coaxial system 11 is made through a conductive strap 26 which electrically connects conductor 23 with inner conductor 13. The strap 26 is generally placed transversely with respect to the longitudinal axis of the system and must be made as short as possible to reduce inductive effects which are particularly damaging for the VSWR at high frequencies.

Conductor 23 extends beyond strap 26 and engages conductor 35 of balun arm 36. Balun arm 36 is a shorted line one-quarter wave length long. More specifically, it consists of conductor 35 connected through strap 26 to inner conductor 13 of coaxial cable 11, shorting member 38 and one-quarter wave length section 39 of outer conductor 12 of coaxial cable 11 which is enclosed within housing 40 of this line transformer.

Housing 40 is provided at one end with a circular flange 41 which is engaged by an insulating piece 42. Insulating piece 42 serves to space and mount conductors 20 and 21 within the housing 40. Screws 43 serve to secure insulating piece 42 to the flange 41 of housing 40.

At the junction between sections 17 and 18 is another insulating spacer 45 which supports conductors 20, 21, 22, 23. A third insulating member 46 secured to housing 40 by means of screws 47 or other appropriate means serves to support conductors 35 and coaxial cable 11.

Coaxial cable 11 has an extension 49 which is part of connecting means 50 for connecting the 50 ohm unbalanced termination of this balun to the unbalanced 50 ohm system.

Inner conductor 13 of coaxial line 11 has a terminal 51 at connector 50. Terminal 51 is shaped to permit easy engagement by the inner conductor of a coaxial line (not shown).

At the connector end of the coaxial line 11 is a metallic member 52 completely surrounding an end portion of line 11.

Member 52 is provided with external threads 53 engaged by the internal threads (not shown) of a cup shape member 55. Thus cup shape member 55 can be moved axially with respect to line 11 by appropriate rotation of cup shape member 55 with respect to member 52.

A coil spring 57 surrounds the exposed end of dielectric cylinder 15 and is positioned between the ends 58 of outer conductor 12 of coaxial line 11 and insulating gasket 60. Insulating gasket 60 is positioned against the very bottom 63 of cup 55 and is rigidly secured to an enlarged portion 65 of inner conductor 13.

When, therefore, cup 55 is rotated with respect to member 52, it will move axially with respect to coaxial line 11 and through engagement of its bottom 63 with cylinder 62 will cause corresponding motion of the dielectric cylinder 15 and inner conductor 13 of coaxial line 11 with respect to outer conductor 12 of coaxial line 11.

When cup 55 is rotated, for example, in a clockwise direction, it will move inner conductor 13 toward the left, as shown in Figure 1, against the bias of the coil spring 57.

Cup 55 is provided also with an externally threaded termination 65 which permits engagement by an appropriately shaped terminal of a coaxial line (not shown).

It should be noted that termination 65 and therefore cup 55 is in electrical contact with the outer conductor 12 of coaxial line 11 through the threaded engagement between cup 55 and threads 53 of member 52 where member 52 is rigidly secured to and in electrical connection with the outer conductor 12 of coaxial line 11. Thus by movement of cup 55, it is possible to adjust the capacitance of line 11 at its junction as clearly shown in Figures 3 and 4. This is necessary in order to obtain minimum voltage standing wave ratio since by the provision of cup 55 it is now possible to continuously test the present balun to obtain this minimum voltage standing wave ratio.

Figures 1A, 2:
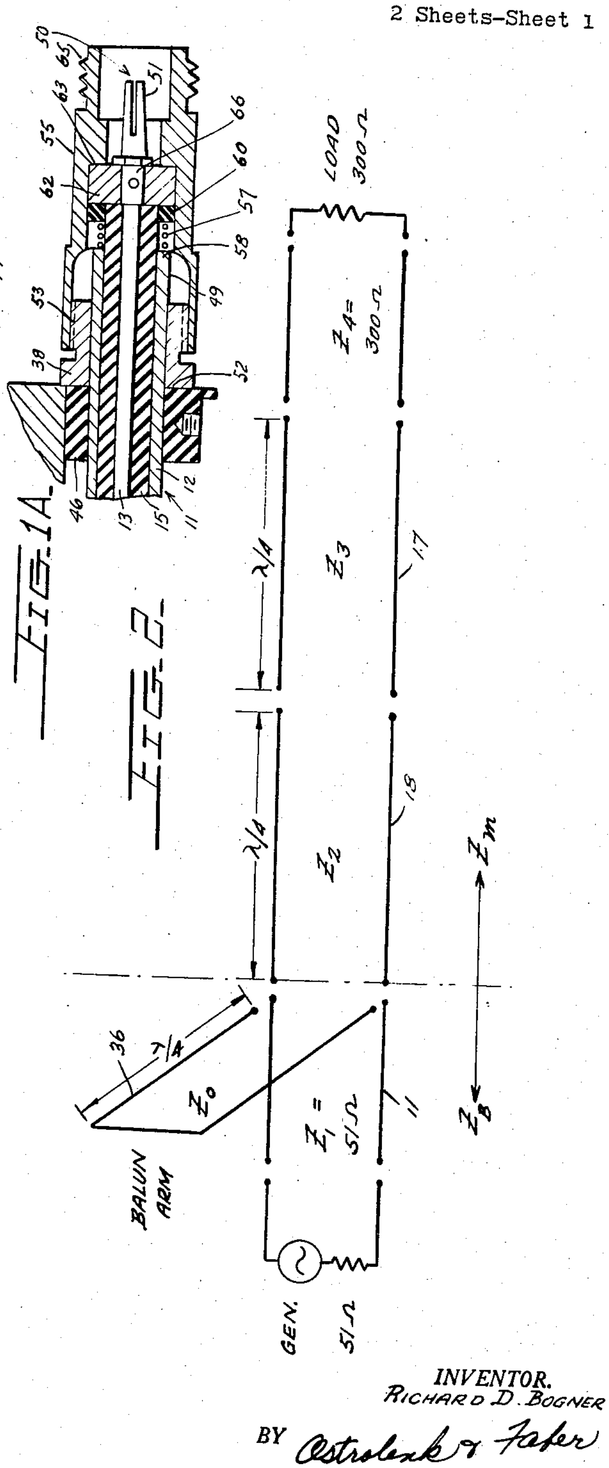
Figure 1A is an enlarged view of the right-hand end of Figure 1.
Figure 2 is an equivalent circuit diagram of the balun of Figure 1.

Figure 2 shows the equivalent circuit of the balun described above and it is there seen that the unbalanced part of the balun consists of the coaxial cable section 11 having an impedance $Z_1$ and the balun arm 36 having an impedance $Z_0$ connected in parallel so that this parallel combination has an impedance $Z_b$.

The balanced part of the balun consists of the two constant impedance sections 18 and 17 presenting an input impedance $Z_m$ (equal to $Z_b$) and having individual impedances $Z_2$ and $Z_3$ respectively.

In Figure 2 an unbalanced generator with its 51 ohm resistance is by way of example connected to the coaxial cable and a 300 ohm load is connected to the section 17 to show the complete operating circuit for this novel balun.

In a specific embodiment of this balun for $Z_1$=51 ohms and $Z_4$=300 ohms, $Z_0$ was made equal to 68 ohms, $Z_2$=86.7 ohms, and $Z_3$=210 ohms where these values are for optimum operating conditions and are obtained by equating $Z_m$ to $Z_b$ and by using the relation $$Z_2^2 \times Z_4 = Z_3^2 = Z_1$$

Figure 3:
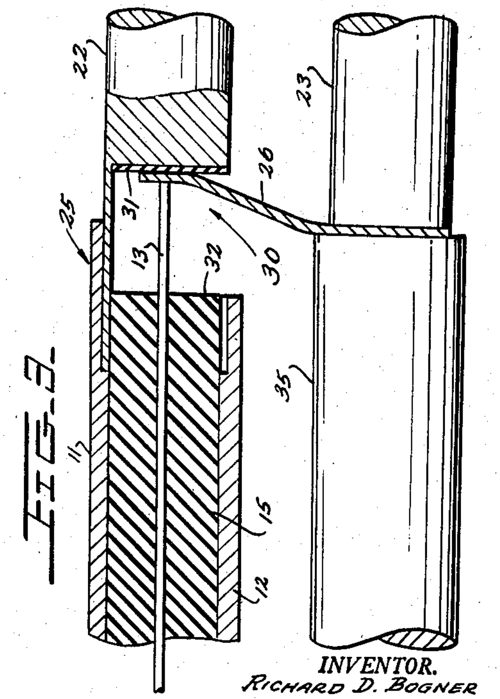
Figure 3 is an enlarged detail of the balun junction showing the main feature of the present invention.

Returning now to the balun junction 25, strap 26 in the present invention is positioned not transversely as done in the prior art, but in the form shown in Figure 3. In Figure 3, in fact, strap 26 instead of being placed transversely to the axis of cable 11, is placed at an angle and close to conductor 22 in the present embodiment.

Figure 5:
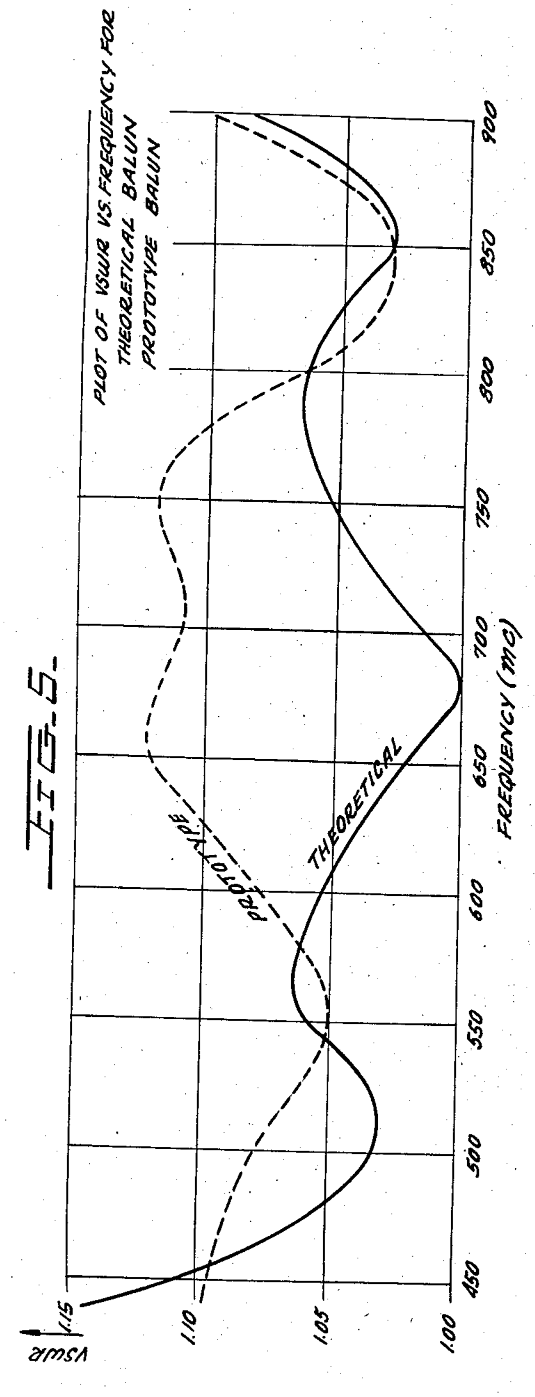
Figure 5 is a plot of VSWR vs. frequency in the range between 450 and 900 mc. for a theoretical balun and for the prototype balun of the present invention.

A tape of insulating material, for example, Teflon tape, is inserted between strap 26 and the corresponding end of conductor 22. The construction of the balun junction as shown in Figure 3 reduces the effects of the inductance at the higher frequencies of the U. H. F. range. This effect caused in prior baluns a sharp rise in their VSWR up to 1.5 and more at the higher frequency limit of 900 mc. When the strap 26 is positioned within a few thousandths of an inch of the top end of the feed slot 30 and the piece of thin Teflon tape 31 is inserted between strap 26 and the top of the slot 30 to prevent a short circuit, the prototype curve of Figure 5 can be obtained.

This curve shows that at no time between 450 and 900 mc. does the VSWR of this balun exceed 1.12. This of course is not the best possible value of VSWR obtainable with this novel feature as clearly shown by the corresponding theoretical curve also shown in Figure 5.

It is assumed that the effect of placing strap 26 very close to the top of feed slot 30 is to add a capacity across the coaxial line 11 to partially cancel the effect of lead inductance caused by strap 26 at the high frequency end of the U. H. F. band. This is more clearly shown by the equivalent circuit of the balun junction in Figure 4. This circuit is assumed to exist between the terminal plane 32 on the coaxial line 11 and the beginning 33 of the two-wire line 18.

Figure 4:
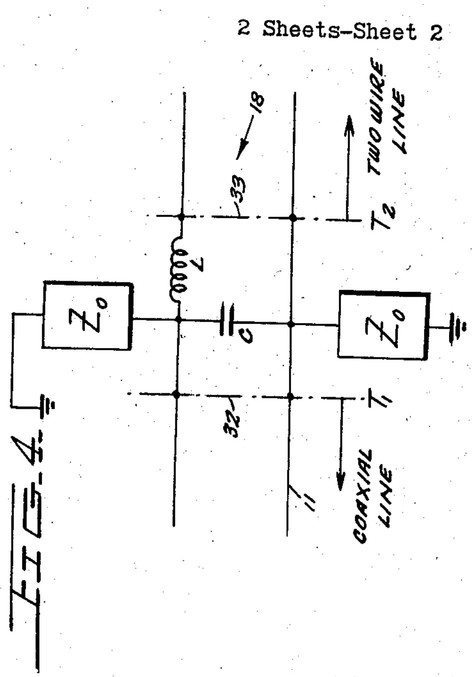
Figure 4 is the equivalent circuit of the balun junction of Figure 3.

In Figure 4, $Z_0$ represents the impedance of the balun arm and L is the self inductance of the feed strap 26 and C is the capacity introduced by placing strap 26 very close to the top of feed slot 30.

In the foregoing the invention has been described solely in connection with specific illustrative embodiments thereof. Since many variations and modifications of the invention will now be obvious to those skilled in the art, it is preferred to be bound not by the specific disclosures herein but only by the appended claims.

I claim:

1. A transmission line transformer comprising a coaxial line for propagating an unbalanced mode and parallel wire line comprised of a first and second conductor for propagating a balanced mode, an arm of conductive material and having a length of substantially ¼ wave length connected between the inner and outer conductors of said coaxial cable in parallel with said coaxial line, first means for electrically connecting the outer conductor of said coaxial line to said first conductor of said parallel wire line and second means for electrically connecting the inner conductor of said coaxial line to said second conductor of said parallel wire line, one end of said arm being electrically connected at the junction of said second means and said second conductor said arm and both said first and second means transforming the said unbalanced mode at the coaxial line into a balanced mode at the parallel wire line, said second means comprising a conductive strap, means for continuously adjusting the position of said strap with respect to the said first conductor of said parallel wire line for obtaining minimum voltage standing wave ratio.

2. A transmission line transformer comprising a coaxial line for propagating an unbalanced mode and parallel wire line comprised of a first and second conductor for propagating a balanced mode, an arm of conductive material and having a length of substantially ¼ wave length connected between the inner and outer conductors of said coaxial cable in parallel with said coaxial line, first means for electrically connecting the outer conductor of said coaxial line to said first conductor of said parallel wire line and second means for electrically connecting said inner conductor of said coaxial line to the second conductor of said parallel wire line, one end of said arm being electrically connected at the junction of said second means and said second conductor said arm and both said first and second means transforming the said unbalanced mode at the coaxial line into a balanced mode at the parallel wire line, said second means comprising a conductive strap, adjusting means for continuously adjusting the position of said strap with respect to the said first conductor of said parallel wire line for obtaining minimum voltage standing wave ratio, said adjusting means comprising a cup-shape connector operatively connected to said conductive strap, said adjusting means mounted at the terminal of said coaxial line and movable axially with respect to said coaxial line to move said conductive strap with respect to said first conductor.

References Cited in the file of this patent

UNITED STATES PATENTS 2,249,963 Lindenblad ____________ July 22, 1941

FOREIGN PATENTS 51,926 France ________________ Feb. 22, 1943

OTHER REFERENCES

"Proceedings of the I. R. E.; October 1947, pages 1153–1155.